Dec. 2, 1969    T. L. TELFORD    3,481,040
HEIGHT GAUGE HAVING PRECISION ADJUSTMENT MEANS
Filed Feb. 16, 1967
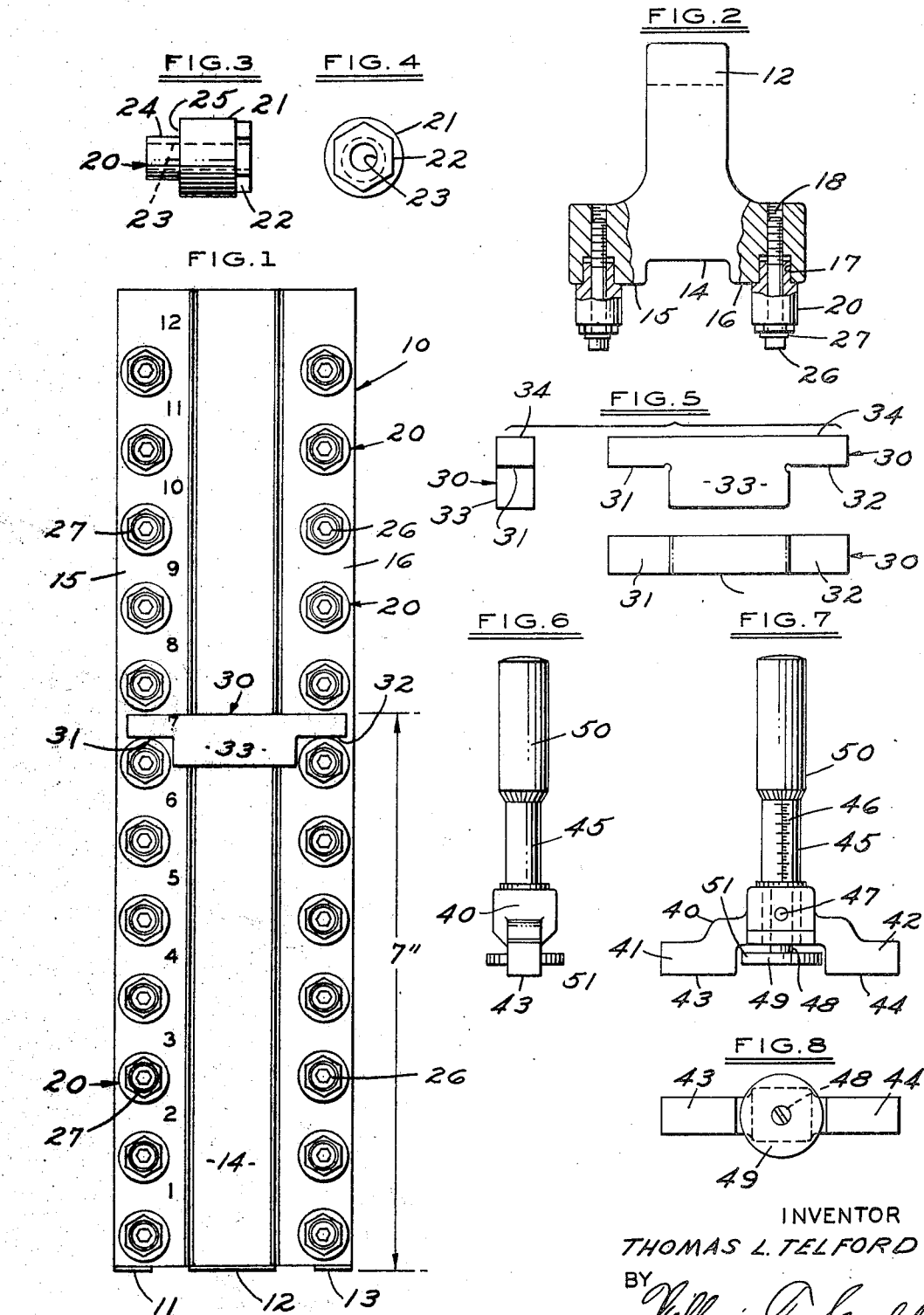
INVENTOR
THOMAS L. TELFORD
BY
William P. Seeold
ATTORNEY

United States Patent Office 3,481,040
Patented Dec. 2, 1969

3,481,040
HEIGHT GAUGE HAVING PRECISION ADJUSTMENT MEANS
Thomas L. Telford, 6230 Livernois Road, Troy, Mich. 48084
Filed Feb. 16, 1967, Ser. No. 621,389
Int. Cl. G01b 3/22
U.S. Cl. 33—169                                    2 Claims

ABSTRACT OF THE DISCLOSURE

A precision height gauge having multiple accurate levels of measurement where each level is made up of two rotatably and eccentrically mounted barrel assemblies having outer annular peripheral surfaces secured to an upstanding base element.

---

This invention relates to precision gauges and in particular to a height gauge having multiple accurate levels of measurements which are adjustable relative to each other and a base to provide precise accuracy.

Height gauges are employed in industry for precisely determining accurate distances in elevation above a base or reference point. Various types have been used in the prior art such as blocks, fixed step gauges having various steps at various heights in a solid piece, and micrometer screw type gauges having a movably adjustable step which travels vertically and must be checked or indicated relative to a master. These devices of the prior art are very difficult to manufacture and are expensive to make. The step gauges of the fixed step type are extremely expensive to manufacture due to the high incidence of scrap as an error in one step requires the salvaging of the whole piece. Micrometer screws have not been developed sufficiently accurately to insure accuracy at all levels so that these gauges are not sufficiently dependable for the precise measurements required in modern industry. While the blocks have proved quite successful, it is necessary to precisely put them together to avoid air gaps, dust, and foreign material so as to insure that they are accurately piled. The blocks also are a problem in that they topple over quite easily if they are built to any height over a few inches.

With the foregoing in view it is a primary object of the invention to provide a height gauge which obviates the difficulties and shortcomings of the gauges of the prior art and which provides and includes the advantageous features hereinafter set forth.

An object of the invention is to provide a height gage which is accurately adjustable so that extremely high manufacturing precision is not vital to the accuracy of the gage in making it because inaccuracies in manufacture may be accurately and precisely compensated by the precision adjustability of the gage.

An object of the invention is to provide locking means for securing the barrel assemblies in adjusted position.

An object of the invention is to provide a stable stand for establishing the scale increments or elements in a true vertical position at a true elevational distance on a base plate.

An object of the invention is to provide paired spaced apertures in the stand at spaced inch points for determining basic inch levels above the base plate.

An object of the invention is to provide a barrel assembly in each of the paired apertures of the stand wherein a shank portion is inserted in each aperture having a barrel thereon and lying eccentric thereto so that upon turning the barrel the peripheral height of the barrel may be adjusted due to the eccentricity.

An object of the invention is to provide a gage having a stand with a channel creating space on room for the anvil of the micrometer anvil, for drop-off space for indicators, and for measuring blocks.

An object of the invention is to provide means for fastening and securing the barrels in the adjusted precisely accurate position.

An object of the invention is to provide an anvil which is positionable between paired adjusted barrels providing an accurate plane from the base plate at the top thereof such as a plane at increments.

An object of the invention is to provide an accurate establishable anvil at each inch plane so that blocks may be used on the anvil to determine accurately increments of a scale between the inch planes.

An object of the invention is to provide a micrometer assembly including a yoke having paired feet for resting on any selected pair of spaced barrels at the inch planes for establishing the anvil of the micrometer at the planes or at fractions or decimals of the planes by using the micrometer adjustment and scale.

An object of the invention is to provide a gage having an anvil block of structural shape lying between the barrel portions so that inaccuracy due to bending of the anvil is reduced to a minimum.

An object of the invention is to provide a gage with its barrel assemblies so spaced and its stand so relieved with a channel that blocks may be stacked on center on the anvil.

An object of the invention is to provide a height gauge having scale plane increments which are adjustable so that slight inaccuracies in manufacture, weather conditions, humidity conditions, heat conditions, cold conditions and other elements may be compensated and the accuracy of the device adjusted and established in conjunction therewith.

These and other objects of the invention will become apparent by reference to the following description of the adjustable height gauge embodying the invention taken in connection with the accompanying drawing in which:

FIG. 1 is a face elevational view of the height gauge showing the paired barrels and the measuring anvil at the seven scale level.

FIG. 2 is a top planned view of the device seen in FIG. 1 shown partly in cross section to illustrate the interior construction and omitting the anvil.

FIG. 3 is an enlarged side elevational view of a barrel assembly seen in FIGS. 1 and 2.

FIG. 4 is a face elevational view of the barrel seen in FIG. 3.

FIG. 5 is a composite view of the measuring anvil seen in FIG. 1, including a side elevational view, an end elevational view, and a bottom plan view.

FIG. 6 is an side elevational view of a micrometer measuring device for use with the stand of FIGS. 1 and 2.

FIG. 7 is a face elevational view of the device seen in FIG. 6; and

FIG. 8 is a bottom plan view of the device seen in FIGS. 6 and 7.

Referring now to the drawing, wherein like numerals refer to like and corresponding parts throughout the several views, the height measuring gauge disclosed therein to illustrate the invention comprises, stand 10 which is the main body of the gauge. The stand 10 is T-shaped in cross section as seen in FIG. 2 to provide triangulated stable support. At least the bottom end of the gauge stand 10 is provided with ground and lapped foot pads 11, 12 and 13. The face of the stand 10 has a longitudinal channel 14 lying between paired relatively raised face surfaces 15 and 16. A plurality of jig-bored apertures 17 are located in each face surface 15 and 16 of the stand 10 in pairs. As shown, there is a plurality of twelve such paired jig bored apertures 17. A smaller accurately centered aperture 18 lies behind each aperture 17 in the stand 10 for receiving a machine screw as hereinafter set forth. The aperture 18 may be threaded.

A barrel assembly 20 is positioned in each aperture 17. Each barrel assembly 20, FIGS. 1–4, has an annular barrel surface 21, a key or hex portion 22, a central aperture 23, an annular shank 24, and a back shoulder surface 25 lying square or normal to the barrel surface 21. The barrel surface 21 and annular shank 24 are eccentric relative to one another. It may be considered that the annular shank 24 lies on the axis and that the barrel annular surface 21 is eccentric relative to the axis. Obviously this may be considered in reverse.

The annular shank 24 of each barrel assembly 20 lies in a jig bored aperture 17 of the stand 10. In the embodiment shown twenty four such barrel assemblies are mounted on the stand 10 in twelve pairs. A machine screw 26 extends through the barrel asembly 20 and is secured in the threaded aperture 18 of the stand 10, a nut, not shown, may be used with the screw 26. An antifriction washer 27 may be located between the barrel assembly 20 and the head of the machine screw 26. The machine screw 26 preferably has a socketed head of the "Allen" type.

An anvil block 30, FIGS. 1 and 5, is positionable on the stand 10 on any pair of barrel assemblies 20. The anvil block 30 is provided with contact portions 31 and 32 and a depending stem portion 33. The stem portion 33 lies between the paired barrel assemblies 20 preventing end-wise movement of the anvil 30. The top surface 34 of the anvil 30 is the gauge surface. The bottom may also be used. The dimension of the anvil 30 between the contact surfaces 31 and 32 and the gauge surface 34 is such that in conjunction with the location of the barrel assemblies 20 on the gauge, that the gauge surface 34 is located at even scale increments such as inches above the base plate when positioned on any pair of barrel assemblies. In other words the barrel assemblies are so located on the stand 10 as to allow for the dimension between the contact surfaces 31 and 32 and the gauge surface 34 of the anvil 30 to establish the gauge surface 34 at even scale increments. However, it is obvious that the integration of the barrel assemblies, dimensions, etc. may be adjusted as desired in the manufacture or establishment of the gauge.

The body of the stand 10 may be any size. As presently made, it is three inches across the face and has a three inch stem portion. The stand itself may be about twelve and one-half inches high. Half inch radii are provided between the stem portion and the face of the stand to facilitate manufacture and heat-treating. The jig bored apertures 17 are located on any scale, as made they are on centers approximately two and one quarter inches apart in pairs. These apertures may be .375" in diameter and approximately one half inch deep. The aperture 18 may be drilled and tapped for 10–32 machine screws. The channel 14 may be one and one eighth inches wide and three sixteenths of an inch deep to facilitate block space, anvil space, and provide drop-off space behind the gauge surface 34 of the anvil 30.

After the stand 10 and barrel assemblies 20 are assembled, the stand 10 is located on a surface plate so that it stands accurately on the ground and lapped pads 11, 12 and 13. The anvil 30 is then placed between a pair of barrel assemblies 20, such as at the "7" scale mark as shown in FIG. 1 The operator then places an "Allen" wrench in the socket of the machine screws 26 and loosens them slightly. He then uses a master gauge to determine the height of the gauge surface 34. He then uses a wrench or a socket on the key or hex portion 22 of the barrel assembly 20 and rotates the barrel assembly so that the barrel assembly is established at its lowest eccentric elevation relative to the shank 24 as established by the jig bored aperture 17. The level of the anvil 30 is then measured against the master gauge. In the event that the gauge surface 34 is gauged as level the operator then tightens the machine screw 26 and secures the adjustment of the barrel assemblies 20. However, in the event that the accurate scale level is not established at the lowest point of eccentricity of the barrels 20, the operator turns the barrels 20 with the wrench thereby raising the level of the anvil 30 until it checks with the master gauge as level at the scale point. The operator then secures the machine screw 26 by tightening it with an "Allen" wrench. This establishes the adjusted level of the paired eccentric barrel assemblies 20 at the "7" scale point on the gauge. The paired barrel assemblies 20 are likewise established for each scale point on the gauge by the operator.

Referring now to the micrometer measuring device of FIGS. 6, 7, and 8, a yoke 40 has paired feet 41 and 42 provided with ground and lapped surfaces 43 and 44. A micrometer tube 45 having a measuring scale 46 is mounted on the yoke 40 and secured with a set screw 47. A micrometer screw 48 extends through the yoke 40 and is equipped with a measuring anvil 49. A head 50 is attached to the micrometer screw 48 and is adapted to turn the screw 48 relative to the nut contained in the micrometer tube 45. It will be understood that by turning the head 50 that the screw rotates in the nut, not shown, to raise and lower the measuring anvil 49 and that the distance of the bottom or top surface of the measuring anvil 49 relative to the gauge surfaces 43 and 44 is fractionally or decimally indicated by the scale 46 relative to indicating edge of the head 50.

In the embodiment shown the gauging surface of the anvil 49 is its top surface 51, although it is understood that the bottom surface may be used as integrated in other embodiments.

In using the micrometer measuring device of FIGS. 6, 7, and 8 in conjunction with the stand disclosed in FIGS. 1 and 2, it will be understood that the micrometer measuring anvil is rested on the barrel assemblies 20 with the paired feet 41 and 42 resting on the paired barrel assemblies 20 at the desired scale level. The plane or elevation of measurement may then be established by turning the head 50 to the desired reading on the scale 46. The operator may then use the top surface 51 of the anvil 49 to indicate or measure the desired height.

In one embodiment of the novel gauge it has been found that the eccentricity of the shank 24 and the barrel portion 21 may be a total of .002". Thus there may be a low point of eccentricity of .001" from the center line and a high point of eccentricity of .001" from the center line. This makes a total of .002" eccentricity. With this eccentric difference it will be obvious that in a ninety degree angular turn of the barrel assembly 20, that the eccentric surface of the barrel portion 21 will move .0005". This course is dependent on the starting position and whether or not the eccentric is rising, falling, or both in the turning arc relative to the anvil 30 or the micrometer yoke 40.

It will be noted that each barrel assembly presents a line point of contact relative to the anvil 30 or the yoke 40. Thus it is not necessary to scrape, slide, or press the anvil or yoke into contact with the barrel assemblies 20. It is sufficient just to rest the anvil 30 or the yoke 40 thereon because a line contact makes for accurate support and for an elimination of space, air entrapment, or the presence of foreign matter, such as dust or dirt.

It will be further understood that each barrel element 21 has dual surfaces on each side adjacent to its high point and dual surfaces on each side adjacent to its low point. Thus there are two like high eccentric surfaces on either side of the high point and two like low eccentric surfaces on either side of the low point. Thus in the event of wear of any of these surfaces the barrel assembly 20 may be rotated and the other like surface used to support the anvil.

While the device has been shown and described in conjunction with a 12 scale stand, it is obvious that any number of scale increments may be embodied in the stand such as 1, 2, 3, or 18. It is also recognized that the gauge may be placed on a riser block of accurate dimensions above the face of the surface plate, thus enabling the operator to measure longer distances or greater heights from the surface plate.

It has been found suitable to make the body of fine grained iron and to three cycle stress-relieve the body and to flame harden the base pads 11, 12 and 13. The barrel assemblies 20 may be made of a 2–5% chrome AHTS steel and hardened and drawn to 62–64 Rockwell C. It is preferable that the stand 10 and barrel assemblies 20 be stabilized through three cycles of heat treat and deep freeze before being finished, ground and lapped. This is also advisable for the anvil 30 and the micrometer yoke 40.

Although but a single embodiment of the invention has been disclosed and described in detail, it is obvious that many changes may be made in the size, shape, detail, and arrangement of the various elements in the invention.

I claim:
1. A height gage comprising,
a stand;
said stand having a series of paired spaced apertures with each having a central axis;
a barrel assembly at each said aperture;
each said barrel assembly having an annular barrel portion and an annular shank portion relative to an axis;
at least one said shank and barrel portion lying eccentric relative to said barrel assembly axis;
said shank portion of each said barrel assembly lying in one said aperture of said stand;
said barrel assembly being rotatable relative to said stand with said shank portion turning in said aperture of said stand on said central axis of said aperture with said barrel portion turning eccentrically relative to said central axis of said aperture of said stand;
said barrel portion having an outer annular peripheral surface which rises and falls relative to said top and bottom of said gage as said barrel portion rotates eccentrically on said axis of said stand aperture;
said peripheral surface being a measuring surface;
the distance of each said measuring surface of each said barrel assembly relative to said stand being thereby adjustable by angularly rotating said barrel assembly; and
means for securing each said barrel assembly in adjusted angular position;
said securing means including a central opening in said barrel assembly lying concentric on the axis of said aperture of said stand,
a counterbored hole in said stand at each said aperture lying concentric on said axis of said aperture,
a shaft, such as a machine screw, lying in said barrel central opening and said stand hole, and
means for locking said shaft, such as a threaded engagement in one said barrel assembly and said stand.

2. In a gage as set forth in claim 1, said shaft being a machine screw having a head portion engaging said barrel assembly and a threaded portion extending through said stand hole, and a nut on said machine screw threaded portion engaging said stand.

References Cited

UNITED STATES PATENTS

| | | | |
|---|---|---|---|
| 721,800 | 3/1903 | Heatly | 33—169 |
| 1,534,865 | 4/1925 | Owens. | |
| 2,508,837 | 5/1950 | Peffers. | |
| 2,879,599 | 3/1959 | Masinda | 33—125 |
| 3,162,955 | 12/1964 | Egli. | |

HARRY N. HAROIAN, Primary Examiner